(12) United States Patent
Kamen et al.

(10) Patent No.: US 7,090,040 B2
(45) Date of Patent: Aug. 15, 2006

(54) MOTION CONTROL OF A TRANSPORTER

(75) Inventors: Dean L. Kamen, Bedford, NH (US);
Robert R. Ambrogi, Manchester, NH (US); J. Douglas Field, Bedford, NH (US); John D. Heinzmann, Manchester, NH (US); Richard Kurt Heinzmann, Francestown, NH (US); Christopher C. Langenfeld, Nashua, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 10/617,608

(22) Filed: Jul. 11, 2003

(65) Prior Publication Data

US 2004/0069543 A1 Apr. 15, 2004

Related U.S. Application Data

(63) Continuation-in-part of application No. 09/325,976, filed on Jun. 4, 1999, which is a continuation-in-part of application No. 08/384,705, filed on Feb. 3, 1995, now Pat. No. 5,971,091, which is a continuation-in-part of application No. 08/479,901, filed on Jun. 7, 1995, now Pat. No. 5,975,225, which is a continuation-in-part of application No. 08/250,693, filed on May 27, 1994, now Pat. No. 5,701,965, which is a continuation-in-part of application No. 08/021,789, filed on Feb. 24, 1993, now abandoned.

(60) Provisional application No. 60/395,299, filed on Jul. 12, 2002.

(51) Int. Cl.
B62D 61/02 (2006.01)

(52) U.S. Cl. ............... 180/7.1; 280/47.34; 280/87.042

(58) Field of Classification Search ................. 180/7.1, 180/19.1–19.3, 65.1, 908, 907, 6.5; 280/47.34, 280/97.042, 87.042
See application file for complete search history.

(56) References Cited

U.S. PATENT DOCUMENTS

| 584,127 | A | | 6/1897 | Draullette et al. |
|---|---|---|---|---|
| 849,270 | A | | 4/1907 | Schafer et al. |
| 1,739,716 | A | | 12/1929 | Fisher |
| 1,849,306 | A | * | 3/1932 | MacGregor .................. 56/14.5 |
| 2,211,650 | A | * | 8/1940 | Dwight ...................... 267/187 |

(Continued)

FOREIGN PATENT DOCUMENTS

DE 2 048 593 5/1971

(Continued)

OTHER PUBLICATIONS

Kawaji, S., *Stabilization of Unicycle Using Spinning Motion*, Denki Gakkai Ronbushi, D, vol. 107, Issue 1, Japan (1987), pp. 1-22.

(Continued)

*Primary Examiner*—Lesley D. Morris
*Assistant Examiner*—Matthew Luby
(74) *Attorney, Agent, or Firm*—Bromberg & Sunstein LLP

(57) ABSTRACT

A transporter for transporting a subject over a surface that may be irregular. The transporter includes a support platform for supporting a load, the loaded support platform defining fore-aft and lateral planes and characterized by a load distribution. A plurality of ground contacting elements are coupled to the support platform. At least one of the plurality of ground contacting elements is driven by a motorized drive arrangement. A sensor module generates a signal indicative of the load distribution of the loaded support platform. Based at least on the load distribution, a controller commands the motorized drive arrangement.

6 Claims, 5 Drawing Sheets

U.S. PATENT DOCUMENTS

| | | |
|---|---|---|
| 2,742,973 A | 4/1956 | Johannesen |
| 3,145,797 A | 8/1964 | Taylor |
| 3,260,324 A | 7/1966 | Suarez |
| 3,283,398 A | 11/1966 | Andren |
| 3,374,845 A | 3/1968 | Selwyn |
| 3,399,742 A | 9/1968 | Malick |
| 3,446,304 A | 5/1969 | Alimanestiano |
| 3,450,219 A | 6/1969 | Fleming |
| 3,515,401 A | 6/1970 | Gross |
| 3,580,344 A | 5/1971 | Floyd |
| 3,596,298 A | 8/1971 | Durst, Jr. |
| 3,724,874 A | 4/1973 | Simpson |
| 3,860,264 A | 1/1975 | Douglas et al. |
| 3,872,945 A | 3/1975 | Hickman et al. |
| 3,952,822 A | 4/1976 | Udden et al. |
| 3,967,862 A | 7/1976 | Hunter et al. |
| 4,018,440 A | 4/1977 | Deutsch |
| 4,062,558 A | 12/1977 | Wasserman |
| 4,076,270 A | 2/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,151,892 A | 5/1979 | Francken |
| 4,222,449 A | 9/1980 | Feliz |
| 4,264,082 A | 4/1981 | Fouchey, Jr. |
| 4,266,627 A | 5/1981 | Lauber |
| 4,293,052 A | 10/1981 | Daswick et al. |
| 4,325,565 A | 4/1982 | Winchell |
| 4,354,569 A | 10/1982 | Eichholz |
| 4,363,493 A | 12/1982 | Veneklasen |
| 4,373,600 A | 2/1983 | Buschbom et al. |
| 4,375,840 A | 3/1983 | Campbell |
| 4,510,956 A | 4/1985 | King |
| 4,560,022 A | 12/1985 | Kassai |
| 4,566,707 A | 1/1986 | Nitzberg |
| 4,570,078 A | 2/1986 | Yashima et al. |
| 4,571,844 A | 2/1986 | Komasaku et al. |
| 4,624,469 A | 11/1986 | Bourne, Jr. |
| 4,645,230 A | 2/1987 | Hammons |
| 4,657,272 A | 4/1987 | Davenport |
| 4,685,693 A | 8/1987 | Vadjunec |
| 4,709,772 A | 12/1987 | Brunet |
| 4,716,980 A | 1/1988 | Butler |
| 4,740,001 A | 4/1988 | Torleumke |
| 4,746,132 A | 5/1988 | Eagan |
| 4,770,410 A | 9/1988 | Brown |
| 4,786,069 A | 11/1988 | Tang |
| 4,790,400 A | 12/1988 | Sheeter |
| 4,790,548 A | 12/1988 | Decelles et al. |
| 4,794,999 A | 1/1989 | Hester |
| 4,798,255 A | 1/1989 | Wu |
| 4,802,542 A | 2/1989 | Houston et al. |
| 4,809,804 A | 3/1989 | Houston et al. |
| 4,834,200 A | 5/1989 | Kajita |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,919,225 A | 4/1990 | Sturges |
| 4,953,851 A | 9/1990 | Sherlock et al. |
| 4,984,754 A | 1/1991 | Yarrington |
| 4,985,947 A | 1/1991 | Ethridge |
| 4,998,596 A | 3/1991 | Miksitz |
| 5,002,295 A | 3/1991 | Lin |
| 5,011,170 A | 4/1991 | Forbes et al. |
| 5,011,171 A | 4/1991 | Cook |
| 5,052,237 A | 10/1991 | Reimann |
| 5,064,209 A | 11/1991 | Kurschat |
| 5,111,899 A | 5/1992 | Reimann |
| 5,135,063 A * | 8/1992 | Kropf .......................... 180/13 |
| 5,158,493 A | 10/1992 | Morgrey |
| 5,161,820 A | 11/1992 | Vollmer |
| 5,168,947 A | 12/1992 | Rodenborn |
| 5,171,173 A | 12/1992 | Henderson et al. |
| 5,186,270 A | 2/1993 | West |
| 5,221,883 A | 6/1993 | Takenaka et al. |
| 5,240,266 A | 8/1993 | Kelley et al. |
| 5,241,875 A | 9/1993 | Kochanneck |
| 5,248,007 A | 9/1993 | Watkins et al. |
| 5,314,034 A | 5/1994 | Chittal |
| 5,350,033 A | 9/1994 | Kraft |
| 5,366,036 A | 11/1994 | Perry |
| 5,376,868 A | 12/1994 | Toyoda et al. |
| 5,419,624 A | 5/1995 | Adler et al. |
| 5,580,089 A * | 12/1996 | Kolka ..................... 280/5.521 |
| 5,641,173 A | 6/1997 | Cobb |
| 5,655,615 A | 8/1997 | Mick |
| 5,657,828 A * | 8/1997 | Nagamachi ................ 180/19.3 |
| 5,701,965 A | 12/1997 | Kamen et al. |
| 5,701,968 A | 12/1997 | Wright-Ott et al. |
| 5,718,534 A | 2/1998 | Neuling |
| 5,775,452 A | 7/1998 | Patmont |
| 5,791,425 A | 8/1998 | Kamen et al. |
| 5,794,730 A | 8/1998 | Kamen |
| 5,873,582 A | 2/1999 | Kaufman et al. |
| 5,921,844 A | 7/1999 | Hollick |
| 5,947,505 A | 9/1999 | Martin |
| 5,971,091 A | 10/1999 | Kamen et al. |
| 5,973,463 A | 10/1999 | Okuda et al. |
| 5,975,225 A | 11/1999 | Kamen et al. |
| 5,986,221 A | 11/1999 | Stanley |
| 6,003,624 A | 12/1999 | Jorgensen et al. |
| 6,039,142 A | 3/2000 | Eckstein et al. |
| 6,042,449 A * | 3/2000 | Ishimoto .................... 446/234 |
| 6,050,357 A | 4/2000 | Staelin et al. |
| 6,059,062 A | 5/2000 | Staelin et al. |
| 6,125,957 A | 10/2000 | Kauffmann |
| 6,131,057 A | 10/2000 | Tamaki et al. |
| 6,223,104 B1 | 4/2001 | Kamen et al. |
| 6,223,114 B1 | 4/2001 | Boros et al. |
| 6,225,977 B1 | 5/2001 | Li |
| 6,272,420 B1 * | 8/2001 | Schramm et al. ........... 180/282 |
| 6,288,505 B1 | 9/2001 | Heinzmann et al. |
| 6,302,230 B1 | 10/2001 | Kamen et al. |
| 6,386,576 B1 * | 5/2002 | Kamen et al. .............. 180/282 |
| 2002/0063006 A1 | 5/2002 | Amesbury et al. |
| 2004/0016584 A1 | 1/2004 | Kamen et al. .............. 180/218 |
| 2004/0055796 A1 | 3/2004 | Kamen et al. ................ 180/21 |

FOREIGN PATENT DOCUMENTS

| | | |
|---|---|---|
| DE | 31 28 112 A1 | 2/1983 |
| DE | 32 42 880 A1 | 6/1983 |
| DE | 3411489 A1 | 10/1984 |
| DE | 44 04 594 A1 | 8/1995 |
| DE | 196 25 498 C1 | 11/1997 |
| DE | 298 08 091 U1 | 10/1998 |
| DE | 298 08 096 U1 | 10/1998 |
| EP | 0 109 927 | 7/1984 |
| EP | 0 193 473 | 9/1986 |
| EP | 0 537 698 A1 | 4/1993 |
| EP | 0663 313 | 7/1995 |
| EP | 0 958 978 A2 | 11/1999 |
| FR | 980 237 | 5/1951 |
| FR | 2 502 090 | 9/1982 |
| GB | 152664 | 2/1922 |
| GB | 1213930 | 11/1970 |
| GB | 2 139 576 A | 11/1984 |
| GB | 2 358 163 A | 1/2000 |
| JP | 52-44933 | 10/1975 |
| JP | 57-87766 | 6/1982 |
| JP | 57-110569 | 9/1982 |

| | | |
|---|---|---|
| JP | 59-73372 | 4/1984 |
| JP | 62-12810 | 7/1985 |
| JP | 0255580 | 12/1985 |
| JP | 61-31685 | 2/1986 |
| JP | 63-305082 | 12/1988 |
| JP | 2-190277 | 7/1990 |
| JP | 4-201793 | 7/1992 |
| JP | 6-171562 | 12/1992 |
| JP | 5-213240 | 8/1993 |
| JP | 6-105415 | 12/1994 |
| JP | 7255780 | 3/1995 |
| WO | WO 86/05752 | 10/1986 |
| WO | WO 89/06117 | 7/1989 |
| WO | WO 96/23478 | 8/1996 |
| WO | WO 98/46474 | 10/1998 |
| WO | WO 00/73101 | 12/2000 |
| WO | WO 00 75001 | 12/2000 |

OTHER PUBLICATIONS

Schoonwinkel, A., *Design and Test of a Computer-Stabilized Unicycle,* Stanford University (1988), UMI Dissertation Services.

Vos, D., *Dynamics and Nonlinear Adaptive Control of an Autonomous Unicycle,* Massachusetts Institute of Technology, 1989.

Vos, D., *Nonlinear Control of an Autonomous Unicycle Robot: Practical Isues,* Massachusetts Institute of Technology, 1992.

Koyanagi et al., *A Wheeled Inverse Pendulum Type Self-Contained Mobile Robot and its Posture Control and Vehicle Control,* The Society of Instrument and Control Engineers, Special issue of the 31$^{st}$ SICE Annual Conference, Japan 1992, pp. 13-16.

Koyanagi et al., *A Wheeled Inverse Pendulum Type Self-Contained Mobile Robot,* The Society of Instrument and Control Engineers, Special issue of the 31$^{st}$ SICE Annual Conference, Japan 1992, pp. 51-56.

Koyanagi et al., *A Wheeled Inverse Pendulum Type Self-Contained Mobile Robot and its Two Dimensional Trajectory Control,* Proceeding of the Second International Symposium on Measurement and Control in Robotics, Japan 1992, pp. 891-898.

Watson Industries, Inc., Vertical Reference Manual ADS-C132-1A, 1992, pp. 3-4.

News article *Amazing Wheelchair Goes Up and Down Stairs.*

Osaka et al., *Stabilization of unicycle, Systems and Control,* vol. 25, No. 3, Japan 1981, pp. 159-166 (Abstract Only).

Roy et al., *Five-Wheel Unicycle System, Medical & Biological Engineering & Computing,* vol. 23, No. 6, United Kingdom 1985, pp. 593-596.

Kawaji, S., *Stabilization of Unicycle Using Spinning Motion, Denki Gakkai Ronbushi, D,* vol. 107, Issue 1, Japan 1987, pp. 21-28 (Abstract Only).

Schoonwinkel, A., *Design and Test of a Computer-Stabilized Unicycle, Dissertation Abstracts International,* vol. 49/03-B, Stanford University 1988, pp. 890-1294 (Abstract only).

Vos et al.; *Dynamics and Nonlinear Adaptive Control of an Autonomous Unicycle—Theory and Experiment, American Institute of Aeronautics and Astronautics,* A90-26772 10-39, Washington, D.C. 1990, pp. 487-494 (Abstract only).

TECKNICO'S Home Page, *Those Amazing Flying Machines,* http://www.swiftsite.com/technico.

*Stew's Hovercraft Page,* http://www.stewcam.com/hovercraft.html.

Kanoh, *Adaptive Control of Inverted Pendulum, Computrol,* vol. 2, (1983), pp. 69-75.

Yamafuji,*A Proposal for Modular-Structured Mobile Robots for Work that Principally Involve a Vechicle with Two Parallel Wheels, Automation Technology,* vol. 20, pp. 113-118 (1988).

Yamafuji & Kawamura, *Study of Postural and Driving Control of Coaxial Bicycle, Paper Read at Meeting of Japan Society of Mechanical Engineering (Series C),* vol. 54, No. 501, (May 1988), pp. 1114-1121.

Yamafuji et al.,*Synchronous Steering Control of a Parallel Bicycle, Paper Read at Meeting of Japan Society of Mechanical Engineering (Series C),* vol. 55, No. 513, (May 1989), pp. 1229-1234.

Momoi & Yamafuji, *Motion Control of the Parallel Bicycle-Type Mobile Robot Composed of a Triple Inverted Pendulum, Paper Read at Meeting of Japan Society of Mechanical Engineering (Series C),* vol. 57, No. 541, (Sep. 1991), pp. 154-159.

Popular Science, Nov. 2002, pp. 52-53 a copy off of http://www.popsci/auto/article/0,12543,384518-2,00.html.

Umea Institute of Design Degree Show 2002, Car Design News, http://www,cardesugbbews,cin/features/2002/020804umea-show/.

International Search Report of Nov. 7, 2003.
International Search Report dated Jan. 7, 2005.

* cited by examiner

MOTION CONTROL OF A TRANSPORTER

CROSS REFERENCE TO RELATED APPLICATIONS

This application claims priority from U.S. Provisional Patent Application Ser. No. 60/395,299, filed Jul. 12, 2002, entitled "Control of a Transporter Based on Disposition of the Center of Gravity."

Additionally, the present application is a continuation-in-part of U.S. patent application Ser. No. 09/325,976, filed Jun. 4, 1999, which is, in turn, a continuation-in-part of U.S. patent application Ser. No. 08/479,901, filed Jun. 7, 1995, now issued as U.S. Pat. No. 5,975,225, itself a continuation-in-part of U.S. patent application Ser. No. 08/384,705, filed Feb. 3, 1995, now issued as U.S. Pat. No. 5,971,091, itself a continuation-in-part of U.S. patent application Ser. No. 08/250,693, filed May 27, 1994, now issued as U.S. Pat. No. 5,701,965, itself a continuation-in-part of U.S. patent application Ser. No. 08/021,789, filed Feb. 24, 1993 and now abandoned.

All of these prior applications are incorporated herein by reference.

TECHNICAL FIELD

The present invention pertains to transporters and methods for transporting a load which may be an individual, and more particularly to controlling motion of a transporter.

BACKGROUND ART

A wide range of vehicles having a motorized drive arrangement are known for conveying various subjects, either for purposive locomotion or for recreational purposes. The means used by an operator to control motion of the motorized drive arrangement of varies greatly. For example, an operator may manipulate an accelerator pedal to control forward motion of an automobile, while steering is typically accomplished using a steering wheel. Or the motion of a sporting vehicle may be controlled by rocking a foot board upon which a user is standing towards the front or rear, so as to mechanically move a throttle cable, as described in U.S. Pat. No. 4,790,548 (Francken). Based on the operator's physical attributes for example, or the transporter's intended functionality, alternative methods for controlling motion of a transporter may be desirable.

SUMMARY OF THE INVENTION

In a first embodiment of the invention there is provided a transporter that includes a support platform for supporting a load, the loaded support platform defining fore-aft and lateral planes and characterized by a load distribution. A plurality of ground contacting elements are coupled to the support platform. At least one of the plurality of ground contacting elements is driven by a motorized drive arrangement. A sensor module generates a signal indicative of the load distribution of the loaded support platform. Based at least on the load distribution, a controller commands the motorized drive arrangement.

In accordance with related embodiments of the invention, the plurality of ground contacting elements include at least two wheels such that the transporter is stable in at least the fore-aft plane. The at least two wheels may include a first wheel rotatable about a first axis and a second wheel rotatable about a second axis, the second axis disposed aft of the first axis. The controller may be configured so that fore and aft motion of the transporter is controlled by shifting the load distribution and/or a position of the center of gravity of the loaded support platform fore and aft. The controller may also be configured so that lateral motion of the transporter is controlled by laterally shifting the load distribution and/or the position of the center of gravity of the loaded support platform. The transporter may include a user interface, such as a joystick or a dial, wherein the controller commands the motorized drive based at least on a signal provided by the user interface. The sensor module may include a force sensor, a load sensor, and/or an angular rate sensor such as a tilt sensor that may be, for example, a gyroscope or inclinometer. An offset may be used in generating the signal. The offset may be adjustable via a user interface on the transporter or a remote control device. The controller may command the motorized drive arrangement so as to cause an acceleration of the transporter. The transporter may further include an externally apprehensible indicator for providing an indication based on motion, such as acceleration. The indicator, which may be a light, may be viewable from behind the transporter.

In accordance with another embodiment of the invention, a method for controlling a transporter having a support platform for supporting a load is presented. The loaded support platform defines fore-aft and lateral planes and is characterized by a load distribution. The transporter includes a plurality of ground-contacting elements, with a motorized drive arrangement driving at least one of the plurality of ground-contacting elements. The method includes determining the load distribution of the loaded support platform, and commanding the motorized drive arrangement based at least on the position of the load distribution.

In accordance with another embodiment of the invention, a transporter includes a support platform for supporting a load, the support platform defining a fore-aft plane and a lateral plane. A plurality of ground contacting elements are coupled to the support platform such that the support platform is statically stable with respect to tipping in the fore-aft and the lateral plane. A pivot element is pivotally coupled to at least one of the ground contacting elements such that the pivot element is capable of being tilted by a user interface. A sensor module generates a signal indicative of the tilt of the pivot element. A controller commands a motorized drive arrangement based on the tilt of the pivot element. The motorized drive arrangement drives at least one of the plurality of ground contacting elements.

In related embodiments of the invention, the pivot element may be capable of tilting in at least the fore-aft plane. The plurality of ground contacting elements may include two laterally disposed wheels rotatable around an axis, the pivot element pivotally coupled to the axis. The pivot element may be flexibly coupled to the support platform, via, for example, at least one spring. The user interface may be a handlebar coupled to the pivot element.

In accordance with another embodiment of the invention, a method for controlling a transporter has a support platform for supporting a load, the support platform defining fore-aft and lateral planes. The transporter includes a plurality of ground-contacting elements such that the transporter is statically stable with respect to tipping. The transporter further includes a pivot element pivotally coupled to at least one of the ground contacting elements such that the pivot element is capable of tilting, and a motorized drive arrangement for driving at least one of the plurality of ground-contacting elements. The method includes tilting the pivot element and commanding the motorized drive arrangement as a function of the tilt.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
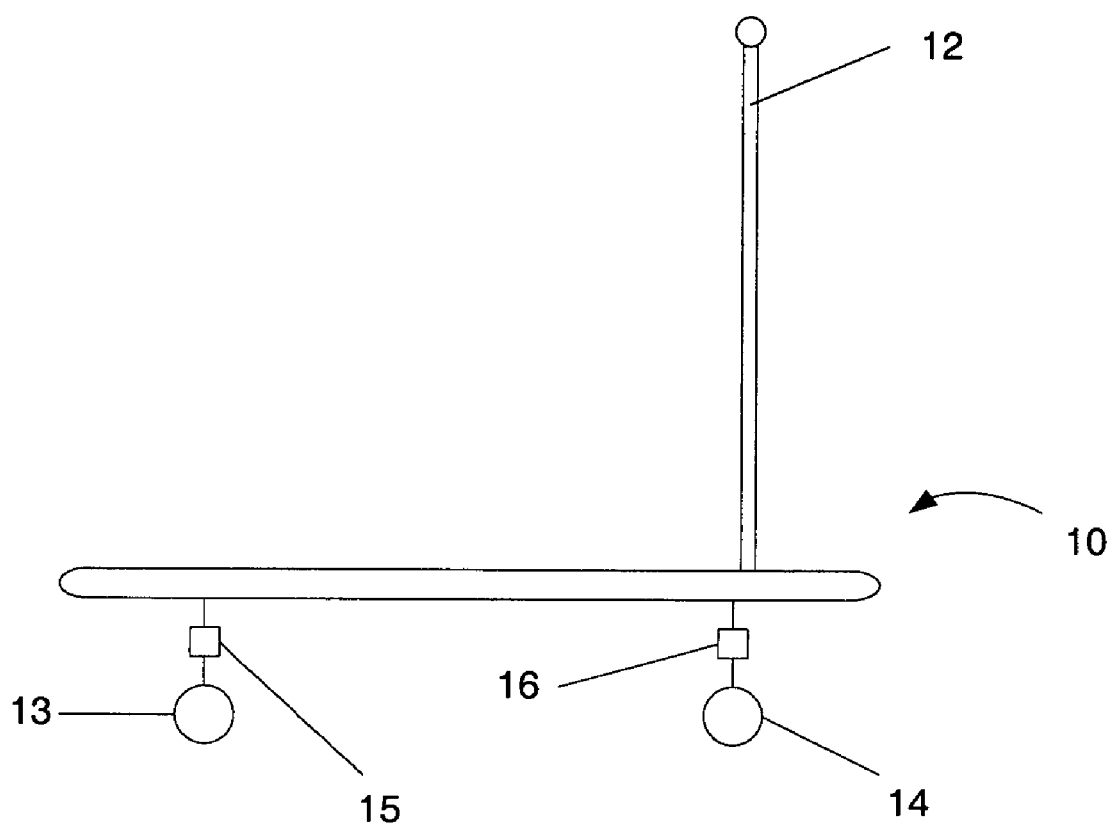
FIG. 1 is an illustration of a side view of a transporter, in accordance with one embodiment of the invention.

In accordance with one embodiment of the invention, FIG. 1 shows a transporter 10 for bearing a load, which may be a living subject, over the ground or other surface, such as a floor, which may be referred herein as "ground." Transporter 10 includes a support platform 11 for supporting the load. A subject, for example, may stand or sit on support platform 11. Attached to support platform 11 may be a handlebar 12 that can be gripped while operating the transporter 10.

Coupled to the support platform 11 are a plurality of ground-contacting elements 13, 14, which provide contact between support platform 11 and the ground. Ground-contacting elements may include, but are not limited to, arcuate members, tracks, treads, and wheels (hereinafter the term "wheel" will be used in the specification to refer to any such ground contacting element without limitation). Wheels 13, 14 help to define a series of axes including the vertical axis, Z—Z, which is in the direction of gravity through a point of contact of the wheel with the ground; a lateral axis, Y—Y, which is parallel to the axis of the wheels, and a fore-aft axis, X—X, which is perpendicular to the wheel axis. Directions parallel to the axes X—X and Y—Y are called the fore-aft and lateral directions respectively.

Transporter 10 is statically stable with respect to tipping in at least the fore-aft plane. To achieve static stability in the fore-aft plane, transporter 10 may include at least a first and second wheel 13, 14. The first wheel 13 is rotatable about a first axis, and the second wheel 14 is rotatable about a second axis that is aft of the first axis such that the center of gravity of the transporter 10 passes between the first and second wheel.

The motion of transporter 10 is controlled by shifting the loaded support platform's center of gravity. It is to be understood that "the position of the center of gravity" as used herein is an example of a moment of a load distribution. Any mechanism for controlling the motion of the device based on the load distribution is within the scope of the present invention as described herein and as claimed in any of the appended claims. Shifting the position of the center of gravity may be accomplished, for example, by a subject shifting his weight on support platform 11. To determine the shift in the center of gravity, the transporter 10 includes a sensor module. The sensor module generates a signal indicative of a position of the center of gravity of the loaded support platform with respect to a fiducial point on the transporter 10.

Sensor module includes at least one sensor. The at least one sensor may be, without limitation, a load sensor, a force sensor, and/or an angular rate sensor, such as a tilt sensor which may be, for example, a gyroscope or an inclinometer.

Referring to FIG. 1 for example, transporter 10 includes two load sensors 15, 16. Load sensor 15 is coupled between the support platform 11 and the first wheel 13, while load sensor 16 is coupled between the support platform 11 and the second wheel 14. Using the sensed loads above each wheel 13 and 14, the position of the center of gravity along the fore-aft axis of the transporter 10 can be computed with respect to a fiducial point, such as, but not limited to, the front of the platform 11. In various embodiments, a single load sensor may be used. For example, if the weight of the loaded support platform is known, the center of gravity can be determined using only the one load sensor. Changes in the output from the load sensor(s) that result from the shifting of the loaded support platform's center of gravity can also be used to control the motion of the transporter 10.

Figure 2A:
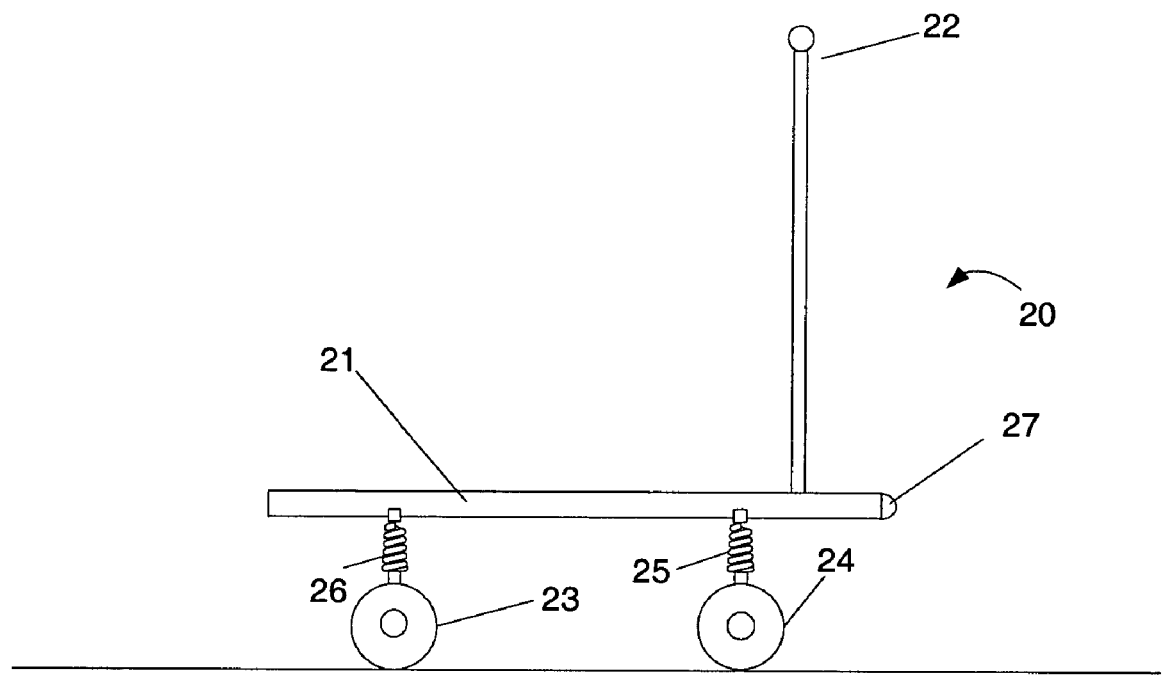
FIG. 2(a) is an illustration of a side view of a transporter, in accordance with one embodiment of the invention.

FIG. 2(a) shows another transporter 20, in accordance with one embodiment of the invention. Transporter 20 includes a support platform 21 that is allowed to tilt in the fore-aft plane, based for example, on the platform's 21 center of gravity, while still being statically stable with respect to tipping in at least the fore-aft plane. For example and without limitation, a pair of springs 26 and 25 may be coupled between wheels 23 and 24, respectively, and support platform 31. In other embodiments, the ground contacting elements 23 and 24 may have some compliance and serve the function of a spring. Based on the tilting of the support platform 21 in the fore-aft plane, at least one sensor 27 generates a signal indicative, for example, of a position of the loaded support platform's center of gravity. Sensor 27 may be, without limitation: a spring and associated sensor (such as a distance sensor); a load sensor; a tilt sensor such as an inclinometer or a gyroscope which provides an inclination of the support platform 21; whiskers; an angular rate sensor; and/or non-contact sensors, such as ultra-sonic or optical. The tilt may be measured, without limitation, relative to gravity, the ground, and/or a reference on the transporter, such as a position proximate the axis of rotation. Attached to the support platform 21 may be a handlebar 22 that can be gripped while operating the transporter 20.

Figure 2B:
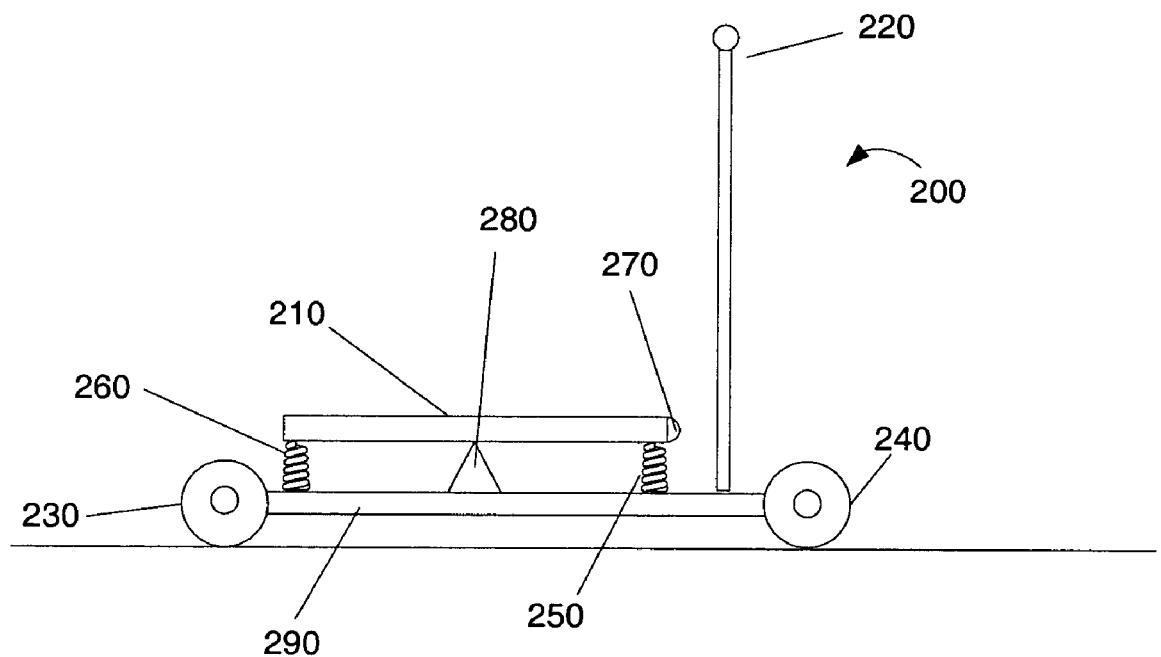
FIG. 2(b) is an illustration of a side view of a transporter, in accordance with one embodiment of the invention.

In another embodiment of the invention, FIG. 2(b) shows a transporter 200 that includes a first support platform 290 and a second support platform 210. First support platform 290 is coupled to wheels 230 and 240 so as to be statically stable with respect to tipping in the fore-aft plane. Second support platform 210 is coupled to the first support platform 290 such that the second support platform 210 can tilt in the fore-aft plane based, for example, on the second platform's 210 center of gravity. Second support platform 210 may be tiltably attached to the first support platform using, without limitation, springs 250 and 260 and/or a pivot mechanism 280. Similar to the above-described embodiment, based on the tilting of the second support platform 210 in the fore-aft plane, at least one sensor 270 generates a signal indicative of a position of the second support platform's 210 center of gravity. Sensor 270 may be, without limitation: a spring and associated sensor (such as a distance sensor); a load sensor; a tilt sensor such as an inclinometer or a gyroscope which provides an inclination of the support platform 507; whiskers; an angular rate sensor; and/or non-contact sensors, such as ultra-sonic or optical. The tilt may be measured, without limitation, relative to gravity, the ground, the first support platform 290 and/or another reference on the transporter. Attached to the first support platform 290 may be a handlebar 220 that can be gripped while operating the transporter 200.

In other embodiments of the invention, the transporter is statically stable with respect to tipping in both the fore-aft and lateral planes. To provide such stability, the tranporter may include three or more wheels. The center of gravity may then be determined in both the fore-aft axis and the lateral axis. For example, force or load sensors may be coupled between the support platform and each wheel, or a tilt sensor(s) may be utilized in combination with springs coupled between each wheel.

Figure 3:
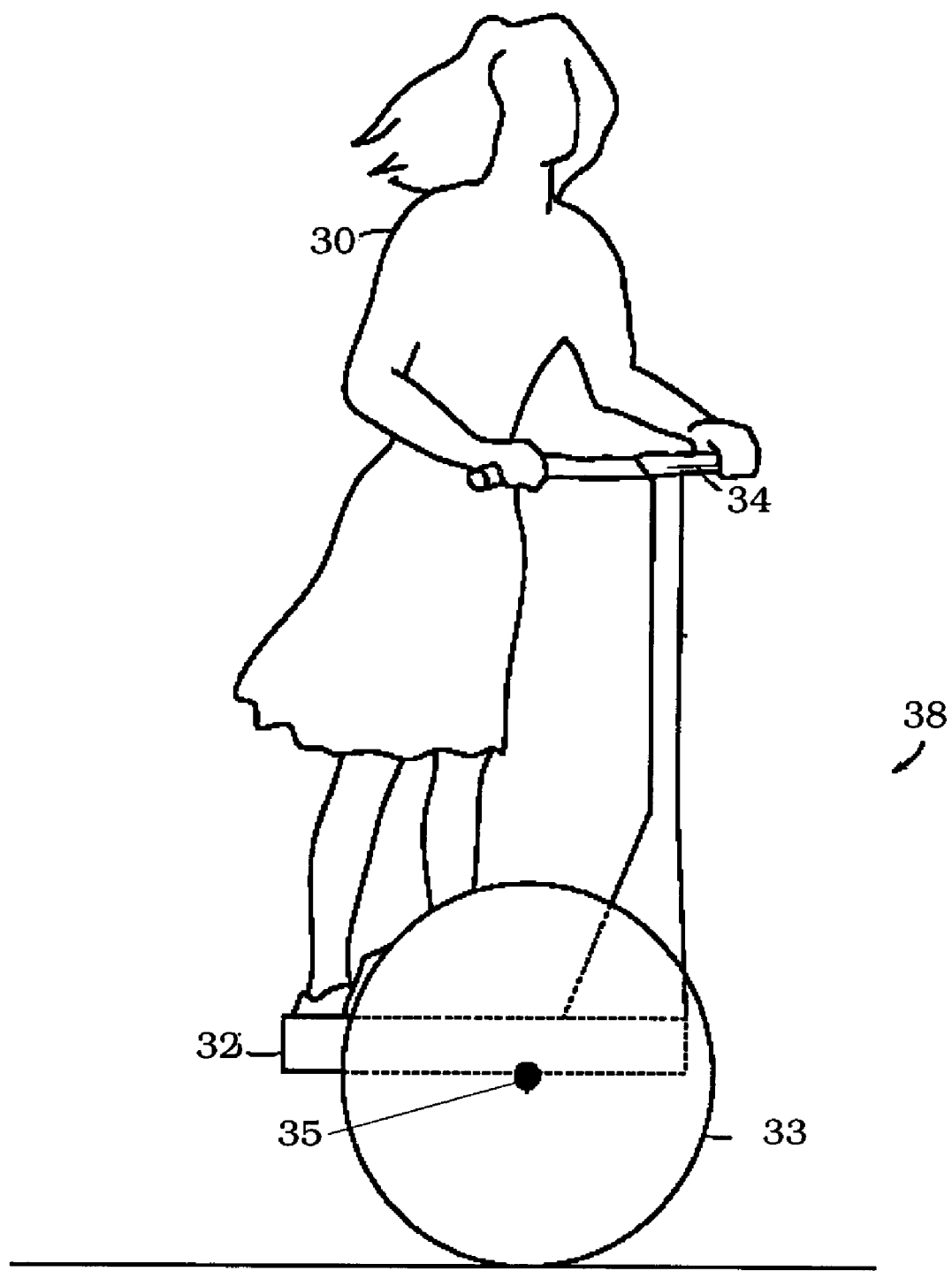
FIG. 3 is an illustration of a side view of a dynamically balancing vehicle.

In still other embodiments, transporter is statically stable with respect to tilting in the lateral plane only, as in the case of the human transporter described in U.S. Pat. Nos. 5,701,965 and 5,971,091, which are herein incorporated by reference. For example, FIG. 3 shows a personal transporter designated generally by numeral 38. The personal transporter 38 includes a support platform 32. A handlebar 34 is attached to the support platform 32. A subject 30 stands on the support platform 32, so that the transporter 38 of this embodiment may be operated in a manner analogous to a scooter. Leaning of the subject 30 causes the support platform 32 to tilt, which is sensed by, without limitation, a tilt sensor (not shown). A control loop is provided so that lean of the subject 30 in a forward or backward direction results in the application of torque to wheel 33 about axle 35 thereby causing an acceleration of the vehicle. Vehicle 38, however, is statically unstable and requires operation of the control loop to maintain dynamic stability.

In the above-described embodiments, a controller receives the signal indicative of a position of the center gravity and/or tilt from the sensor module. Based at least on the position of the center of gravity and/or tilt, the controller commands a motorized drive arrangement for driving one at least one of the plurality of wheels. The controller may also respond to commands from other operator interfaces, such as a joystick or dial attached, for example, to a handlebar.

Figure 4:
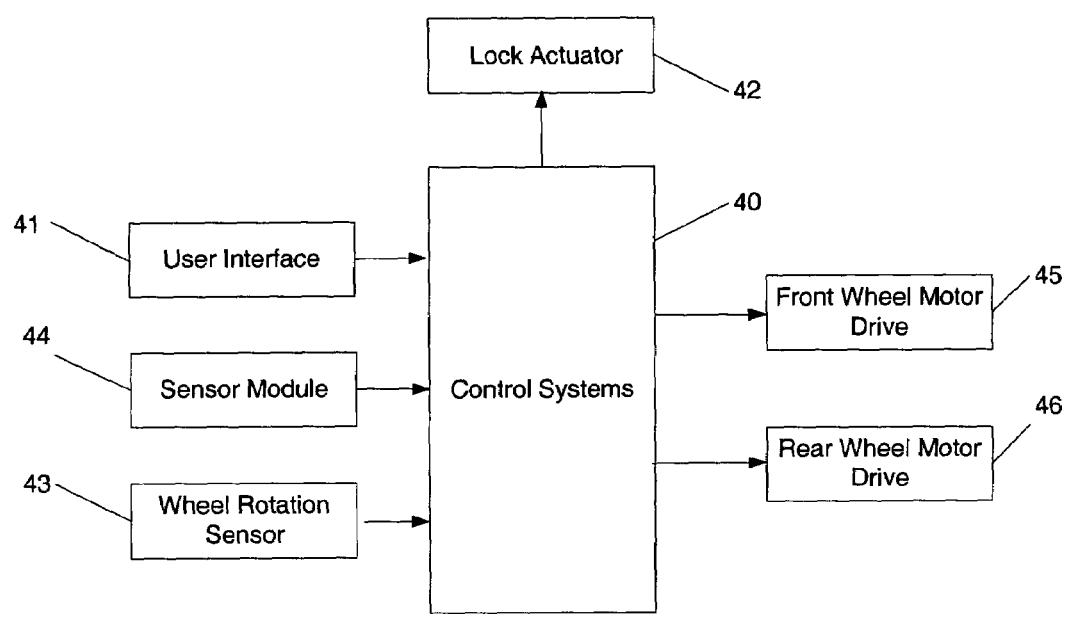
FIG. 4 is a block diagram of a controller for controlling the motorized drive of a transporter, in accordance with one embodiment of the invention.

In accordance with one embodiment of the invention, the block diagram of FIG. 4 shows a controller 40 for controlling the motorized drive of the transporter. Controller 40 receives an input characteristic of a position of the center of gravity and/or tilt of the loaded support platform from sensor module 44. Based at least on the input from the sensor module 44, controller 40 commands at least one motorized drive 45, 46. Controller 40 also interfaces with a user interface 41 and a wheel rotation sensor 43. User interface 41 may, for example, include controls for turning the controller 40 on or off. When the controller 40 is turned off, the transporter's wheels may be free to move, such that transporter acts as a typical push scooter. User interface 41 may also control a locking mechanism 42 for locking one or more wheels of the transporter.

The controller 40 includes a control algorithm to determine the amount of torque to be applied to one or both wheels based on the position of the center of gravity and/or tilt of the loaded support platform. The control algorithm may be configured either in design of the system or in real time, on the basis of current operating mode and operating conditions as well as preferences of the user. Controller 40 may implement the control algorithm by using a control loop. The operation of control loops is well known in the art of electromechanical engineering and is outlined, for example, in Fraser & Milne, Electro-Mechanical Engineering, IEEE Press (1994), particularly in Chapter 11, "Principles of Continuous Control" which is incorporated herein by reference.

As an example, and not meant to be limiting, the control algorithm may take the form:

$$\text{Torque Command} = K \cdot (C + O)$$

where K=gain,
C=a vector defining the loaded support platform's center of gravity with respect to a fiducial point on the transporter, and
O=offset.

The loaded support platform's position of center of gravity, C, may be in the form of an error term defined as the loaded platform's desired position of center of gravity minus the loaded platform's sensed position of center of gravity. The loaded platform's desired position of center of gravity may be a predetermined constant in the control algorithm. Alternatively, a subject on the transporter may control the setting of the platform's desired position of center of gravity via user interface 41. For example, upon stepping onto the platform and prior to allowing movement of the transporter, a subject may activate a switch on the transporter's handlebar that triggers determination of the desired position of center of gravity based on inputs received from the sensor module 44. This allows the subject to acquire a known initial position, from which the subject can then deviate so as to cause a change in the loaded platform's position of center of gravity.

The gain, K, may be a predetermined constant, or may be entered/adjusted by the operator through user interface 41. Gain K is, most generally, a vector, with the torque determined as a scalar product of the gain and the center-of-gravity displacement vector. Responsiveness of the transporter to changes in the loaded support platform's center of gravity can be governed by K. For example, if the magnitude of at least one element of vector K is increased, a rider will perceive a stiffer response in that a small change in the loaded platform's position of center of gravity will result in a large torque command.

Offset, O, may be incorporated into the control algorithm to govern the torque applied to the motorized drive, either in addition to, or separate from, the direct effect of C. Thus, for example, the user may provide an input by means of a user interface 41 of any sort, the input being treated by the control system equivalently to a change, for example, in the loaded platform's position of center of gravity.

Thus, in the above-described embodiments of the invention, motion of the transporter may be controlled by changing the loaded platform's center of gravity, such as by the operator leaning or alternatively, changing his position on the platform. Depending on the control algorithm, an initial change in the center of gravity in the fore direction may result in positive torque being applied to at least one of the wheels, causing the wheels to move forwards. Likewise, an initial change in the center of gravity in the aft direction may result in a negative torque applied to at least one of the wheels, causing the wheels to move in the aft direction. If the subject then continues to lean (or remains in his changed position on the platform) such that the center of gravity of the loaded platform remains the same, the motor will continue to torque at approximately the same rate.

As described above, in addition to being statically stable in the fore-aft plane, the transporter may also be statically stable with respect to tipping in the lateral plane, with a signal representative of the position of the center of gravity being determined in either or both fore-aft and lateral directions. In such embodiments, lateral shifts in the center of gravity of the loaded platform can be used either separately or in combination with shifts in the center of gravity in the fore-aft plane to control motion of the transporter. For example, and not meant to be limiting, fore-aft shifts in the center of gravity of the loaded support platform can control fore-aft motion, while lateral shifts in the center of gravity control steering of the transporter.

Steering may be accomplished in an embodiment having at least two laterally disposed wheels (i.e., a left and right wheel), by providing, for example, separate motors for left and right wheels. Torque desired for the left motor and the torque desired from the right motor can be calculated separately. Additionally, tracking both the left wheel motion and the right wheel motion permits adjustments to be made, as known to persons of ordinary skill in the control arts, to prevent unwanted turning of the vehicle and to account for performance variations between the two motors.

Figure 5:
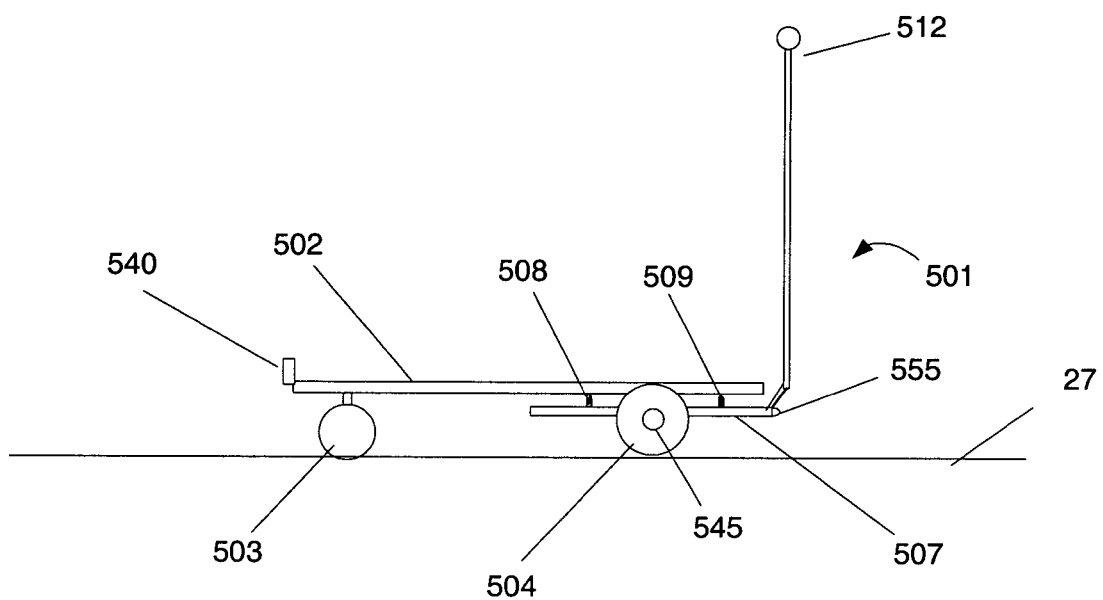
FIG. 5 is an illustration of a transporter, in accordance with one embodiment of the invention.

In accordance with another embodiment of the invention, FIG. 5 shows a transporter 501 that includes a support platform 502 capable of supporting a load. The support platform 501 is coupled to a plurality of wheels 503 and 504 and is statically stable with respect to tipping in both the fore-aft and lateral planes. A pivot element 507 is pivotally coupled to at least one of the wheels 503 and 504, such that the pivot element 507 is capable of tilting. For example, the plurality of ground contacting elements may include two laterally disposed wheels, right wheel 504 and left wheel (not shown), rotatable around an axis 545, wherein the pivot element 507 is pivotally coupled to the axis 545 such that pivot element 507 can tilt in the fore-aft plane.

Tilting of the pivot element 507 is accomplished via an operator interface, which may be, without limitation, a handlebar 512. Handlebar 512 is coupled to the pivot element 507 such that, for example, a tilt of the handlebar 512 in the fore-aft direction results in a corresponding tilt of pivot element 507.

At least one sensor 555 generates a signal indicative of the tilt of the pivot element 507. Sensor 555 may be, without limitation: a spring and associated sensor (such as a distance sensor); a load sensor; a tilt sensor such as an inclinometer or a gyroscope which provides an inclination of the support platform 507; whiskers; an angular rate sensor; and/or non-contact sensors, such as ultra-sonic or optical. The tilt may be measured, without limitation, relative to gravity, the ground, and/or a reference on the transporter, such as a position proximate the axis of rotation. A controller controls a motorized drive arrangement drives at least one wheel 504 based at least on the tilt.

In various embodiments, the pivot element 507 is flexibly coupled to support platform 502, for example, by a plurality of springs 508–509. This allows the pivot element platform 507 to maintain a predetermined tilt when the handlebar 512 is not manipulated. In various embodiments, the controller may be preset so as to command a specified motion based on the predetermined tilt. For example, when the predetermined tilt is sensed, controller may command no motion to the motorized drive arrangement. Responsiveness of the transporter can also be controlled via springs 508–509.

As in above-described embodiments, steering of the transporter 501 may be controlled by any number of user interfaces known in the art, such as, without limitation, a joystick or thumbwheel positioned on or in close proximity to the handlebar. Motorized drive arrangement may have separate motors, as described above, for separately driving laterally disposed left (not shown) and right wheels 504 based on signals received from the user interface. Laterally disposed left wheel (not shown) and right wheel 503 may be, for example, caster wheels that are capable of turning around a vertical axis to support turning of transporter 501.

In above-described embodiments of the invention, the transporter may include an indicator, referred to as reference number 540 in FIG. 5. Indicator 540 is apprehensible externally, based on motion commanded via the motorized drive arrangement. For example, the indicator 540 may be based on acceleration commanded. The externally apprehensible indication 540 may include, without limitation, a light that can be illuminated.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A transporter comprising:
   a support platform for supporting a load, the support platform defining a fore-aft plane and a lateral plane;
   a plurality of ground contacting elements coupled to the support platform;
   a pivot element pivotally coupled to at least one of the ground contacting elements such that the pivot element is capable of tilting;
   a user interface for allowing a tilt of the pivot element in an operating mode in which the support platform remains statically stable with respect to tipping in the fore-aft and the lateral plane;
   a sensor module for generating a signal indicative of the tilt of the pivot element;
   a motorized drive arrangement for driving at least one of the plurality of ground contacting elements;
   and a controller for commanding the motorized drive arrangement based on the signal indicative of the tilt of the pivot element.

2. The transporter according to claim 1, wherein the pivot element is capable of tilting in at least the fore-aft plane.

3. The transporter according to claim 1, wherein the plurality of ground contacting elements include two laterally disposed wheels rotatable around an axis, the pivot element pivotally coupled to the axis.

4. The transporter according to claim 1, wherein the pivot element is flexibly coupled to the support platform.

5. The transporter according to claim 4, wherein the pivot element is flexibly coupled to the support platform via at least one spring.

6. The transporter according to claim 1, wherein the user interface is a handlebar coupled to the pivot element.

* * * * *